United States Patent [19]

Schlaegel

[11] Patent Number: 4,652,414

[45] Date of Patent: Mar. 24, 1987

[54] PROCESS FOR MANUFACTURING AN EAR FITTED ACOUSTICAL HEARING AID

[75] Inventor: Norman Schlaegel, Fremont, Calif.

[73] Assignee: Innovative Hearing Corporation, San Francisco, Calif.

[21] Appl. No.: 700,965

[22] Filed: Feb. 12, 1985

[51] Int. Cl.[4] .............................................. B29C 33/40

[52] U.S. Cl. .................................... 264/154; 181/129; 181/135; 264/222; 264/302; 264/DIG. 30

[58] Field of Search ............... 264/138, 139, 154, 156; 181/135, 136, 129, 130

[56] References Cited

U.S. PATENT DOCUMENTS

| | | | |
|---|---|---|---|
| 3,440,714 | 4/1969 | Ryan et al. | 264/302 X |
| 3,883,627 | 5/1975 | Fitts | 264/220 |
| 3,989,790 | 11/1976 | Bruner et al. | 264/225 |
| 4,098,277 | 7/1978 | Wendell | 264/222 X |
| 4,556,122 | 12/1985 | Goode | 181/136 |
| 4,569,812 | 2/1986 | Werwath et al. | 264/222 |

*Primary Examiner*—Jan Silbaugh
*Assistant Examiner*—Mary Lynn Fertig
*Attorney, Agent, or Firm*—Flehr, Hohbach, Test, Albritton & Herbert

[57] ABSTRACT

A hollow shell-type hearing aid is prepared from an impression of the ear. A mold is formed from the impression. An opening is cut in the mold and the mold is filled through the opening with hardenable material. The hardenable material is allowed to cure until a hard shell of the material forms on the surface of the mold. The remaining hardenable material is poured out of the mold through the opening and the shell is then removed.

16 Claims, 2 Drawing Figures

PROCESS FOR MANUFACTURING AN EAR FITTED ACOUSTICAL HEARING AID

This invention lies generally in the field of manufacturing processes for hearing aids which are fitted to a wearer's ear.

This application incorporates by reference the pending application of Richard Goode entitled "An Ear Acoustical Hearing Aid" Ser. No. #6-557701 filed Dec. 2, 1983 now U.S. Pat. No. 4,556,122. This incorporated application is assigned to the assignee of this invention. This patent describes a hard-walled hollow shell defining a acoustically resonant chamber. The chamber encloses a volume of air with the concha; the wall thickness is one millimeter or more.

The type of hearing aid which the present process is intended to be used to manufacture is capable of shifting the grain of the normal external ear (especially as it comprises the concha of the auricle) to a lower frequency which is more useful for the understanding of speech by a person who suffers from a hearing difficiency. Such capability is important when hearing dificiencies become worse than 25 db at important mid-frequency speech sounds. It is at this loss level that a person is effected by the hearing loss. The major effect is difficulty in understanding speech, particularly when background noise is present. This happens because many important consonent sounds of speech lie within the 1500 to 3000 Hz frequency range.

When the hearing loss becomes noticable to a person, the only known effective treatment is an electronic hearing aid. However, such a hearing aid has a number of disadvantages, including high cost, constant battery replacement and other repair costs. Furthermore, when the hearing loss is mild (worse than 25 db hearing level but better 40 db) the person does not need sound amplification except in certain situations such as meetings, church, and conversations where there is some background noise.

Thus an improved in-the-ear non-electronic acoustical hearing aid providing significant hearing improvement for persons with mild hearing loss has long been needed. The acoustical hearing aid disclosed in the incorporated present invention provides the desired 5–15 db increase in amplification of sounds in the 1000–3000 Hz range.

It is essential to the successful use of this hearing aid that the hearing aid be fitted to be worn in the concha of the auricle of the user's ear. This requires a precise manufacturing process which duplicates a mold taken of the concha of the auricle and the associated ear canal.

It is therefore an objective of the present invention to provide a manufacturing process for making a hearing aid which can be accurately fitted to the concha of a hard of hearing person.

It is a further objective of the present invention to provide a manufacturing process for such a hearing aid which is relatively inexpensive, as one of the major marketing advantages of the present invention is cost as compared to electronic hearing aids.

A further difficulty with previous in-the-ear hearing aids is their relative unsightliness. It is therefore an objective of the present invention to provide a manufacturing process for an in-the-ear hearing aid which consistantly produces a hearing aid of acceptable appearance.

It has been concluded that the best way to produce the hearing aid of the present invention is to make it transparent.

It is therefore an objective of the present invention to provide a manufacturing molding process which can consistantly produce a transparent hearing aid. The difficulty in typical processes is that the result of the process is frequently cloudy or flawed.

Another difficulty faced by the designers of the present process is that since the hearing aid must be fitted tightly within the ear of the wearer as well as into the ear canal, the hearing aid will be uncomfortable if it does not have a smooth surface, free of burrs and granularity.

It is therefore an objective of the present invention to provide a manufacturing process which can be used to produce a smooth surfaced hearing aid which can be consistantly comfortably worn by a wearer.

Yet another difficulty with hearing aid and especially a hollow chamber hearing aid of this transparent type is that it is easily lost or damaged.

It is therefore an objective of the present invention to provide a molding process in which the molds are reusable so that the hearing aid can be inexpensively duplicated both for a person who wishes to order multiple hearing aids to insure against future loss, or a person who needs to replace a lost hearing aid.

In accordance with the preferred embodiment of the present invention, the method essentially comprises the steps of beginning with an impression of the ear concha and canal. A wax coating is applied over the surface of the impression to fill in depressions created by skin pores. A base plate is shaped to the bottom portion of the mold; a top portion of the mold is then formed over the remainder of the ear impression. The mold is then cut open to remove the original ear cast.

After resealing of this opening, a top opening 15 cut; this opening is preferably formed by cutting of the cast of the ear canal. The mold is filled with a hardenable acrylic material until it is full; the hardening of the material is carefully timed so that only the outer shell of acrylic material conformed to the interior of the mold has permanently formed. The remainder of the acrylic hardening material is then poured out, and the ear hearing aid is removed from the shell. After smoothing of the material (to which the acrylic readily lends itself) the hearing aid is ready for use.

The advantages and features of the present invention will become more readily apparent by review of the following description in which.

Figure 1A:
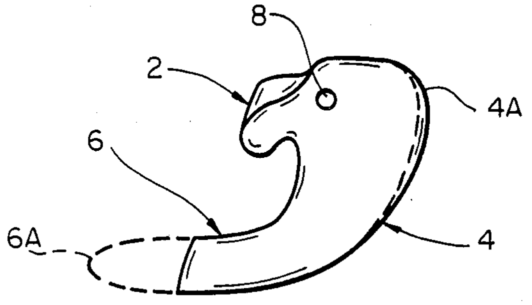
FIG. 1A illustrates the finished ear fitted hearing aid.

The process begins with an impression taken of a user's ear. The impression includes the concha 4 of the auricle of the ear, the helix of the ear which is the upper forward part of the ear represented by mold portion 2, and the ear canal represented by mold portion 6. It should be noted that the way this process is executed, the finished product is substantially identical to the initial ear impression, except that the finished product is a transparent, hollow form with an inlet hole 8 added and the canal portion 6 shortened so that it fits the entrance to the ear. It is especially important that the finished product is in one piece, and without seams.

Beginning from the ear impression, the canal portion 6 is first built up somewhat, adding a canal extension *6a* for reasons which will be obvious as the process is described. At this point any sharp edges are cut off the initial ear impression, and the concha or bowl area 4 is built up in the region 4a to provide a better fitting edge. in the finished product. A hot wax is then spread over the figure,; this is so that the mold (FIG. 1B) after it is built up over the impression of the ear can be removed without damage to either the interior of the mold or the ear impression.

Figure 1B:
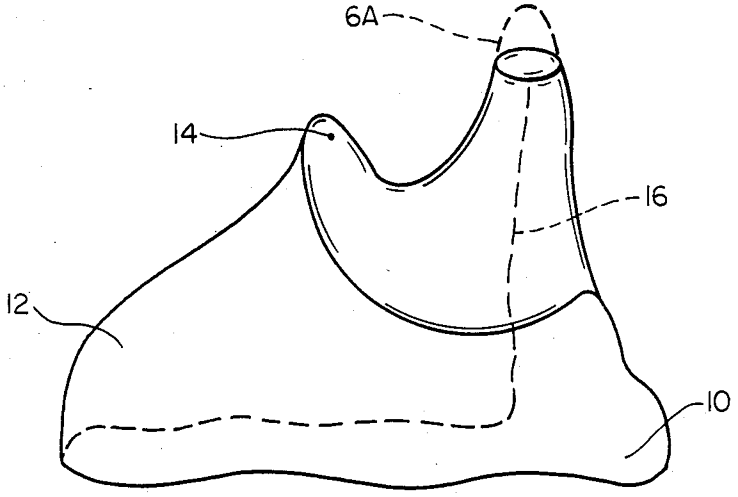
FIG. 1B illustrates the mold from which the fitted ear hearing aid is taken.

Next a silicone mold as shown in FIG. 1B is formed. The silicone mold is formed of a combination of Dow-Corning RTV #3110 white silicone and Dow-Corning RTV #3112 white silicone.

First, a base plate 10 of the white silicone material is formed; as this hardens, the base portion distant from the ear canal (which comprises the helix) is pushed down into this base 10. This forms the bottom or base portion of the mold. The same silicone formulation is then poured over the remainder of the ear impression to form the remainder of the mold 12. Preferably, a second coat is applied over the first, to be sure that no hole or the like remain. Once the mold 10, 12 is formed, a horizontal incision is made along the area where the top and bottom half molds meet. These two halves are then separated about 70%; it is best not to separate the two halves completely so that they can be realigned easily.

The ear impression of FIG. 1A is removed. The mold is then put back together and the portion of the mold which is covering the extended portion of the ear canal 6a is cut off to provide an opening for pouring the material in which will be used to form the hearing aid. A pinhole vent 14 is also defined in the area where the mold fits what was the auricle 2. It is critical to locate this vent 14 at the highest point of the helix as determined when the mold is sitting flat. This hole allows air to escape as acrylic material is poured into the cast.

The hardenable material of which the hearing aid is formed comprises a mixture of an acrylic powder and a liquid Methyl Methacrylate Monomer. A mixture of these is poured into the mold, completely filling the mold with the liquid compound. By retaining a sample of the hardenable liquid outside the mold, the hardening characteristic can be monitored. When the compound becomes like a syrup, then the outer portion of the acrylic has hardened, conforming to the interior of the mold. The remainder of the acrylic is still pourable and can be poured out.

The entire mold is now submerged in heated water, then removed from the heater and allowed to cool to room temperature. By cutting the mold opening along a vertical incision line 16, the finished ear piece can be removed; the mold itself can be saved for future uses.

The ear piece is then polished. A hole 8 is drilled at the proper distance from the ear canal piece 6 to provide the necessary tuning characteristic. The size of the hole 8 controls the center frequency response characteristic of the ear piece. The ear piece of FIG. 1A is then ready for delivery.

Certain modifications of the above process may occur to a person of skill in the art who has reviewed the above invention disclosure. Therefore, the scope of the present invention is to be limited only by the following claims.

What is claimed is:

1. A process for making a one-piece in-the-ear seamless hollow shell-type chamber hearing aid from an impression of the ear concha, helix and canal comprising, building up a portion of the impression of the ear, forming a molding completely covering the impression of the ear having a molding surface complementary to the surface of the impression of the ear, opening the mold to remove the impression of the ear, cutting a first opening into the mold by removing the portion of said mold over said built up portion, filling said mold through said first opening with hardenable material which cures into a hard surface, letting the mold and curing material stand for a period of time until said hard surface of said shell-type chamber forms, removing the remaining hardenable material by pouring the material out of said first opening, leaving said hearing aid shell to harden, removing the shell from the mold.

2. A process as claimed in claim 1 wherein said step of building up comprises building up the ear canal and outer border of the concha prior to formation of the mold to allow for shrinkage of the mold in the manufacturing process as well as provide excess material in said mold over said ear canal, and cutting away a portion of said mold over said built up ear canal to provide said first opening for entry of said curable material.

3. A process as claimed in claim 2 including the further step of applying a wax coating over said impression prior to formation of said mold to provide a smooth surface on the impression.

4. A process as claimed in claim 1 wherein said step of forming a molding completely covering the impression comprises the step of forming a base plate shaped to the bottom portion of the impression, the base being the surface distal from the impression of the ear canal, and then covering the remainder of said impression.

5. A process as claimed in claim 1 wherein said base plate comprises silicone.

6. A process as claimed in claim 5 including the step of applying an additional coat of silicone material over said first coating of said impression.

7. A process as claimed in claim 6 wherein the hardenable material for filling the mold is an acrylic material.

8. A process as claimed in claim 1 wherein said step of cutting an opening comprises cutting off the end of the ear canal portion of the mold.

9. A process as claimed in claim 8 including the further step prior to pouring in said hardenable material of defining a drain hole at the top of the helix of said ear impression mold to allow air to escape from said mold during filling and to facilitate pouring the hardenable material from the shell.

10. A process as claimed in claim 7 including the step of filling said shell with hot water after removing said hardenable material from said shell.

11. A process as claimed in claim 7 wherein the step of cutting an opening includes cutting off said ear canal portion to form an opening for entry and exit of said hardenable material.

12. A process as claimed in claim 1 wherein said step of removing said shell includes cutting said mold vertically, whereby said shell is removable but said mold is preserved and is reusable.

13. A method as claimed in claim 1 including the step of forming a wax coating over the surface of the impression prior to the step of covering the impression of the ear, said step of forming a molding completely covering the impression comprises the step of forming a base plate shaped to the bottom portion of the impression, the base being the surface distal from the impression of the ear canal, and pouring material over said ear impression to form a top portion of the mold.

14. A method as claimed in claim 13 wherein said step of cutting an opening comprises cutting off the end of the ear canal portion of the mold.

15. A process as in claim 1 including the further step prior to pouring in said hardenable material of defining a drain hole at the top of the helix of said ear impression mold to allow air to escape from said mold during filling and to allow for pouring the hardenable material from the shell.

16. A process as in claim 15 comprising the further step of building up the ear canal prior to formation of the mold, said first opening into said mold being defined by cutting away said build-up portion of said ear canal.

* * * * *